(No Model.)  2 Sheets—Sheet 1.

W. NASH.
PUMP.

No. 564,447.  Patented July 21, 1896.

Witnesses  
F. L. Durand

Inventor  
William Nash,  
By H. B. Willson  
Attorney (No Model.)

2 Sheets—Sheet 2.

W. NASH.
PUMP.

No. 564,447.  Patented July 21, 1896.

Witnesses
F. L. Ourand.
J. S. Suit.

Inventor
William Nash,
By H. Bevintor.
Attorney

UNITED STATES PATENT OFFICE.

WILLIAM NASH, OF GYPSUM, KANSAS.

PUMP.

SPECIFICATION forming part of Letters Patent No. 564,447, dated July 21, 1896.

Application filed October 1, 1895. Serial No. 564,262. (No model.)

*To all whom it may concern:*

Be it known that I, WILLIAM NASH, a citizen of the United States, residing at Gypsum, in the county of Saline and State of Kansas, have invented certain new and useful Improvements in Pumps; and I do declare the following to be a full, clear, and exact description of the invention, such as will enable others skilled in the art to which it appertains to make and use the same.

My invention relates to pumps, and more particularly to pumps actuated by an animal for the purpose of supplying water to a drinking-trough.

The object of the invention is to provide a simple, durable, and inexpensive pump and mechanism connected therewith whereby the pump is automatically operated to raise water into the trough.

With these objects in view the invention consists of certain features of construction and combinations of parts, which will be hereinafter fully described and claimed.

Figure 1:
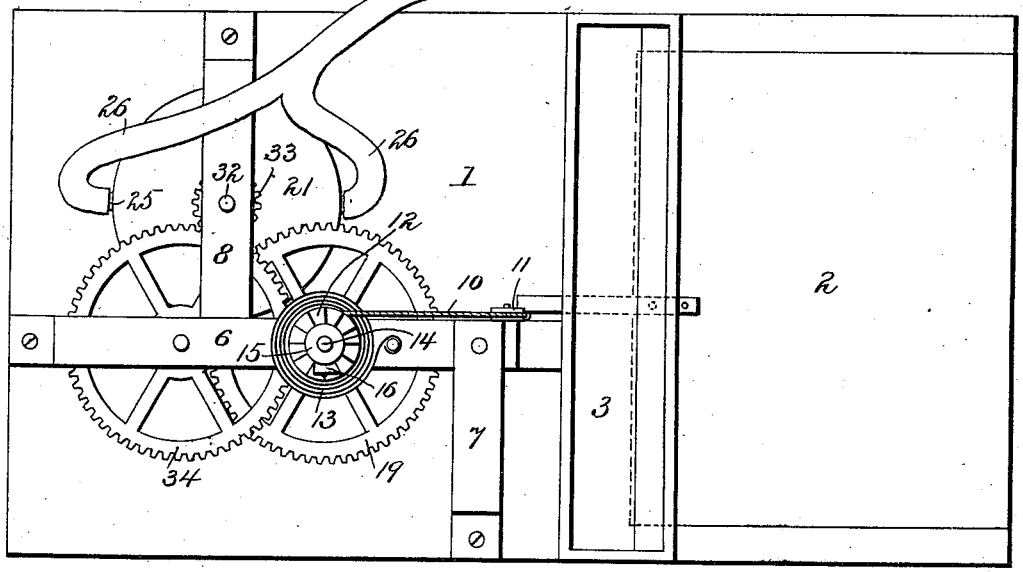
Figure 2:
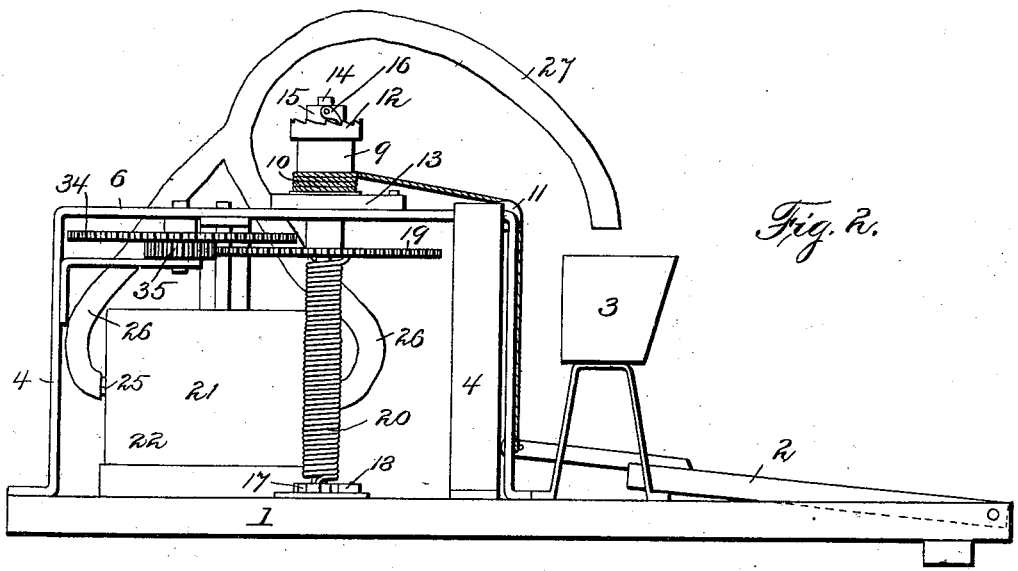
Figure 3:
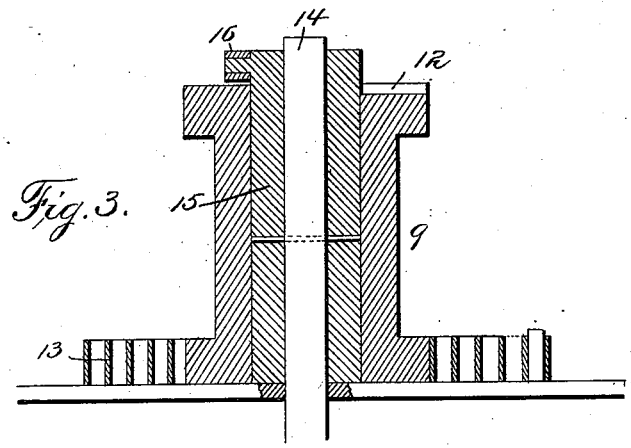
Figure 4:
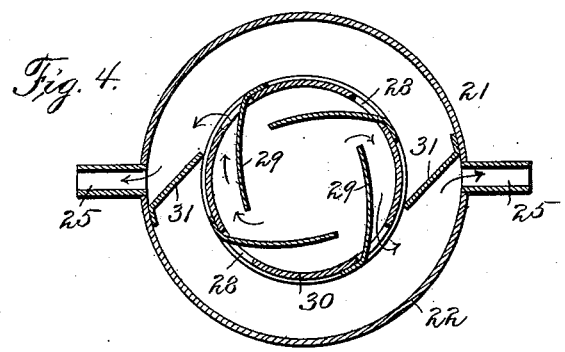
Figure 5:
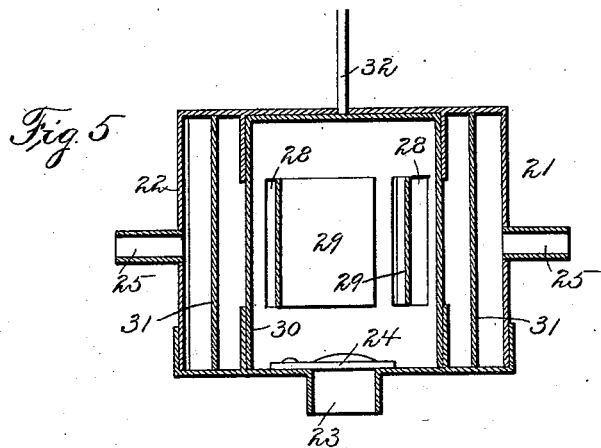

In the accompanying drawings, Figure 1 is a plan view illustrating its application to a water-trough. Fig. 2 is a side elevation of the same. Fig. 3 is a vertical sectional view through the winding-drum and parts immediately connected therewith. Fig. 4 is a transverse sectional view through the pump, and Fig. 5 is a longitudinal vertical sectional view of the same.

In the drawings, 1 denotes a supporting-base, to which is hinged a platform 2, and upon which is supported a drinking-trough 3. 4 denotes standards rising from the supporting-base, provided with cross-pieces 6, 7, and 8. Supported upon cross-piece 6 is a winding-drum 9, about which a rope 10 is wound, and is connected to the rear end of the platform after passing over a guide-pulley 11. The upper end of this winding-drum is provided with a ratchet-wheel 12, while its lower end is connected to the cross-piece 6 by a coiled spring 13, one end of which is secured to the cross-piece and the other end to the drum.

14 denotes a shaft which has its lower end journaled to the base and its upper end keyed to a spool 15, which projects through the drum. The upper end of this spool 15 is provided with a pawl 16, which engages the ratchet-wheel of the winding-drum. The lower end of this shaft is provided with a ratchet-wheel 17, which is engaged by a spring-actuated pawl 18.

19 denotes a gear-wheel which is loose upon the shaft.

20 denotes a coiled spring which is coiled around the shaft and has one end fixed to the gear-wheel 19.

From the foregoing description it is evident that when an animal steps upon the platform to get into position to drink from the trough he will depress the platform and unwind the drum against the action of the spring. This rotation of the drum will wind up the spring 20, but will not rotate the gear-wheel 19. When the animal steps from the platform, the winding-drum spring will rotate the drum, wind up its cord, and elevate the platform in the position shown in Fig. 2, or, in other words, return to its normal position. The spring 20 will now act to rotate the wheel 19, and through its connection with the pump 21 the water will be caused to flow from said pump into the trough.

The pump just referred to and the connections I will now proceed to describe.

The pump consists of a casing 22, having an inlet 23, provided with foot-valve 24, and peripheral outlets 25, to which is attached the branches 26 of a supply-pipe 27, which conducts the water to the trough. Within this casing is a pumping-cylinder having a lower open end and a closed upper end and provided with openings 28 in its sides. Plates 29 extend the full length of these openings and project inwardly tangentially to the cylinder 30.

31 denotes guide or deflector wings, which are secured to the interior of the casing at a point to one side of the outlets thereof, so that the water elevated by the cylinder and thrown against the sides of the casing by the plates 29 will be directed out through the openings in the branches of the pipe. The course or flow of the water is shown by the arrows in Fig. 4 of the drawings. The cylinder-shaft 32 may be connected with the cog-wheel 19 by any suitable train of gearing. For instance, the cylinder-shaft may be provided with a pinion 33, which meshes with the gear-wheel 34, supported by the cross-piece 6, and provided with the pinion 35, which meshes with the gear-wheel 19. Any other gearing, however, may be employed without departing from the spirit of my invention.

From the foregoing description, taken in connection with the accompanying drawings, the construction of my invention will be readily understood. When an animal steps upon the pivoted platform the same will lower, thereby drawing upon the rope, which, in unwinding, will revolve the winding-drum, which will cause the ratchet-wheel thereof to engage the pawl and lock the shaft to the winding-drum, so that the spring 20 of said shaft will be wound up and will set the gearing in motion to pump the water. Upon the animal stepping upon the platform the winding-drum spring will return the drum and the platform to its normal position.

Having thus described my invention, what I claim, and desire to secure by Letters Patent of the United States, is—

The combination with the pivoted platform, the trough and a pump, a winding-drum provided with ratchet-wheels and connected with said platform by a rope, a shaft provided with a hub, said shaft projecting through the winding-drum, and the one provided with a pawl to engage the ratchet-wheel of the drum, a spring connecting the drum to the frame, a gear-wheel loosely mounted upon said shaft, a spring coiled upon said shaft and having one end secured thereto, and the other end secured to the gear-wheel, a ratchet-wheel secured to said shaft and provided with a spring-actuated pawl, and gearing connecting the pump with the first-named gear-wheel, substantially as described.

In testimony whereof I affix my signature in presence of two witnesses.

WILLIAM NASH.

Witnesses:
SAML. A. DRURY,
A. B. SUIT.